United States Patent
Allard et al.

[11] 3,721,981
[45] March 20, 1973

[54] PULSE RADAR RANGING

[75] Inventors: Robert Allard; John Lawton Clarke, both of Malvern, England

[73] Assignee: Minister of Aviation Supply in Her Britannic Majesty's Government of the United Kingdom of Great Britain and Northern Ireland, London, England

[22] Filed: Nov. 17, 1970

[21] Appl. No.: 90,394

[30] Foreign Application Priority Data

Nov. 19, 1969 Great Britain......................56,555/69

[52] U.S. Cl. ...............................................343/13 R
[51] Int. Cl...............................................G01s 9/12
[58] Field of Search...........................343/13 R, 5 DP

[56] References Cited

UNITED STATES PATENTS

| | | | |
|---|---|---|---|
| 3,439,318 | 4/1969 | Bostroem et al. | 343/13 R |
| 3,555,549 | 1/1971 | Watkins et al. | 343/13 R |
| 3,504,333 | 3/1970 | Grada et al. | 343/13 R |
| 3,539,978 | 11/1970 | Stedtnitz | 343/13 R |

*Primary Examiner*—Samuel Feinberg
*Assistant Examiner*—G. E. Montone
*Attorney*—Hall, Pollock & Vande Sande

[57] ABSTRACT

A radar ranging system for calculating the time interval between transmitted and received pulses or vice versa by means of a pulse generator, means for causing the transmitter to transmit a pulse at a time which is random compared with the pulse generator output, means for admitting pulses from the pulse generator to a counter for a plurality $m$ of time intervals and means for dividing the output of the counter by $m$.

6 Claims, 8 Drawing Figures

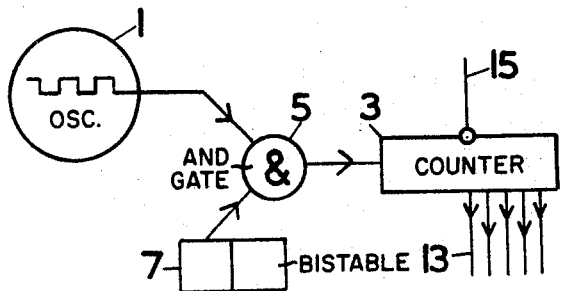
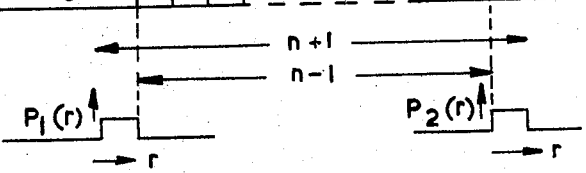
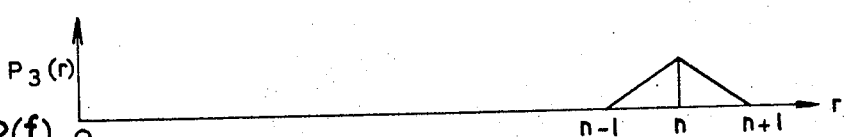
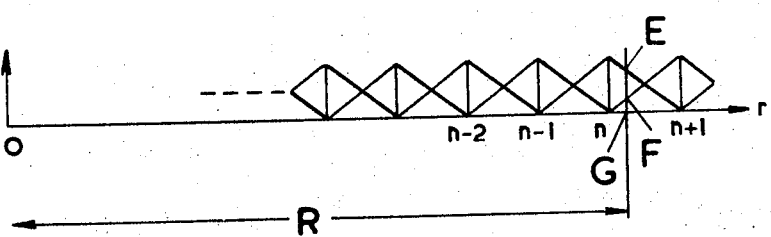

PULSE RADAR RANGING

BACKGROUND OF THE INVENTION

The present invention relates to pulse radar ranging.

During the past fifteen years various automatic pulse ranging equipments have been developed in which radar range is extracted automatically in binary digital form. Usually a counter is started by admitting a precision oscillator to its input at the instant of the transmitter start pulse, the two sources being unsynchronized. The counter number is strobed into a set of stores by the returning radar signals. The stored counts are then measures of radar ranges, the counter being reset at maximum range to await the next radar start pulse. The resulting ranges are fed to a data processing system.

Ranges measured in this way are digitally accurate to ± 1 range increment of the oscillator. Attempts to better this performance have taken the form of locking the oscillator to the transmitter start pulse either by starting the oscillator with this pulse or by generating the start pulse by frequency division from the continuously running oscillator, thus giving a digital accuracy of ± ½ range increment.

It is an object of the invention to provide a method of measuring range which is digitally accurate to substantially less than one range increment of the oscillator.

SUMMARY OF THE INVENTION

The present invention is particularly appropriate in a case where the radar range of a single co-operating target is to be fed into a computer. In such a case one could postulate a radar which produced sample readings for averaging by the computer. Clearly it would be advantageous for the averaging to be performed at the radar in order to relieve the workload on the computer. Apart from this question, however, there is the question of the bandwidth of the communications channel between the radar and the computer. For example, suppose a computer demands four 17-bit readings of radar range per second. If the range is accurate then the bandwidth of the channel required will be 68 bits per second. However, if the range accuracy has to be increased 16 times by averaging inside the computer then the number of samples passed to the computer must be increased by $16^2$ to 17,408 bits per second.

According to the present invention there is provided a pulse radar ranging system including means for generating a sequence of pulses regular in time, means for generating a set of first pulses each so timed relative to a radar transmitted pulse that either it is contemporaneous with the radar transmitted pulse or separated therefrom by a number of pulses in the sequence of pulses representing the maximum range to be measured and whose timing is random compared with the sequence of pulses, means for generating a set of second pulses each contemporaneous with a radar received pulse, whereby an interpulse period of a first kind is defined as that period which starts with a first pulse contemporaneous with a radar transmitted pulse and ends with the next occurring second pulse and an interpulse period of a second kind is defined as that period which starts with a second pulse and ends with the next occurring first pulse representing maximum range, counting means, means for allowing the sequence of pulses to be applied to the counting means for the duration of a plurality of interpulse periods of the same kind as each other, and means for extracting from the counting means the count registered in the counting means divided by the number of interpulse periods for the duration of which the sequence of pulses was applied to the counting means.

BRIEF DESCRIPTION OF THE DRAWINGS

An embodiment of the invention will be described by way of example with reference to the accompanying drawings in which:

FIG. 1 is a block diagram of a pulse radar ranging system and

FIG. 2(a) – 2(g) inclusive are a series of waveforms and other diagrams illustrating the operation of a pulse radar ranging system.

DESCRIPTION OF THE PREFERRED EMBODIMENTS

In FIG. 1 an oscillator 1 feeds a counter 3 via an AND-gate 5. A bistable circuit 7, set by an input 9 energized at the time a radar pulse is transmitted and reset by an input 11 energized at the time a radar pulse is received, is connected to open the AND-gate 5 when it is set. The most significant part of the output of the counter 3 is read out on output channels 13 and the counter is cleared via an input channel 15.

A large number of range samples, say $m$, where $m$ is an integral power of 2, is collected over a period during which target movement is insignificant. The part of the output of the counter 3 that is read out will represent the summed total ranges divided by $m$ and will therefore give an average range over the period of measurement, and its accuracy will be better expected of any single digital range measurement.

The received radar pulse is preferably from a transponder rather than a radar echo in order to avoid clutter being received and resetting the bistable circuit 7.

The following numerical example may help to put the invention into its proper perspective:

conventional integrated circuits can count reliably at 37.5MHz, and so the range oscillator 1 is arranged to have a frequency of 37.5MHz. This gives a fundamental digital resolution R per sample of 4 meters. If the averaged digital resolution requires is one-fourth meter then the number of samples $m$ to be taken will be given by $$4 \sqrt{m} = \frac{1}{4}$$

or $m = 256 = 2^8$.

Suppose now that the maximum range to be measured is just under 2,048 meters. (Such a range can be measured in a multi-stage binary counter having a most significant stage registering 1,024 meters.) Then with $\Delta R = 4$ meters, a range sample will have 9 bits. With $m = 2^8$ this will imply that an extra eight counter stages are required to hold the 256 ranges measured. Therefore the counter 3 will be a 17 stage counter, and its most significant stage will represent $2^{16} \times 4$ meters.

Division by $2^8$ is now automatically effected by defining a new position for the binary point so that it is right shifted by eight places. The 17 successive stages of the counter 3 will then have significances in ascending powers of 2 from $2^{-6}$ meters = 1/64 to $2^{10}$ meters = 1,024 meters. An output taken from the 13 most significant stages of the counter will give the averaged range with a fine digital resolution of $\Delta R \sqrt{m} = \frac{1}{4}$ meter, with a maximum range of $2,047\frac{3}{4}$ meters, which is what was required.

FIG. 2 provides an analysis of the operation of the circuit. The waveform shown in FIG. 2(a) represents the pulse output of the oscillator 1, and the waveforms shown in FIGS. 2(b) and 2(c) represent respectively the front edges of the transmitted and received radar pulses. The consequent stepping of the counter 3 in terms of range increments $\Delta r$ is shown in FIG. 2(d). The stepping starts at the pulse A immediately following the front edge of the transmitted radar pulse and stops at the pulse B immediately preceding the front edge of the received radar pulse.

FIG. 2(e) consists of two rectangular distributions the first of which is the ideal density function $p_1(r)$ of all radar transmitted signals which could start the counter 3 at the pulse A, plotted against range, and the second of which is the ideal density function $p_2(r)$ of all radar received signals which could stop the counter 3 at the pulse B, plotted against range, and they imply that if the counter 3 starts at zero than the actual range $r$ will be in the interval $$(n-1)/\Delta r \leq r \leq (n+1)\Delta r$$

The probability $p_3(r)$ that the range will have a particular value $r$ will be a triangular function centered on $n\Delta r$ and is plotted as a function of $r$ in units of $\Delta r$ in FIG. 2(f).

FIG. 2(g) is a series of such triangular waveforms superimposed. For any real range $R$ between, say, $n\Delta r$ and $(n+1)\Delta r$ then $$R = n\cdot\Delta r + FG\cdot\Delta r/(EG + FG)$$

where $E$, $F$, and $G$ are the intercepts of the abscissa $R$ on the probability function $p_3(r)$ of $n$ and $n + 1$ and the $r$ axis respectively.

Over a series of $m$ measurements the counter 3 will have the value $(n + 1)$ added to it say $q$ times and the value $n$ say $m - q$ times where $m$ is the total number of samples. The average measured range $R$ will be given by $$R = n\cdot\Delta r + q\Delta r/m$$

If $m$ is large then $$q/m \approx FG/(EG + FG)$$

and this averaged range $R$ is more nearly equal to the actual range than the values $n\cdot\Delta r$ or $(n + 1)\Delta r$.

It is imperative that no attempt be made to lock the transmitter start pulse to the oscillator because the effect is required of a random distribution of this start pulse, with respect to the oscillator period, in order to produce a valid average. The standard deviation of error of this average is $S\cdot m^{-1/2}$, where S is the standard deviation of error of any individual measured range.

For example, in a ship berthing system, if $m$ is 256 and the counter period is 16 nanosecs (equivalent to a radar range of 8 feet) then the standard deviation of error of the average range may in suitable circumstances be as low as 3 inches. This last figure depends on the shape of the statistical distribution of the actual range corresponding to a measured digital range. The derivation of this distribution for an ideal case is given above.

The distributions shown in FIG. 2 are ideal but, owing to finite rise times of signals and hysteresis in the triggering of the counter, the distributions of FIG. 2(g) spread into their neighboring range increments and will have non-linear skirts. In the example shown, a practical sample of measurements on a single stationary target will contain some at $n$, some at $n-1$ and some at $n+1$ range increments. This does not affect the validity of the averaging process providing that the distributions are not skew. If the distributions are skew a range bias is introduced. However even this does not matter since the radar system as a whole has to be calibrated initially because it contains inherent delays, which themselves appear as range biases, and in the initial calibrations the range biases due to the skewness of the distribution will be compensated for.

If averaging must be carried out by special purpose equipment on a continuously tracked target, as in ship berthing, then a missing reply will upset the count by allowing the counter 3 in FIG. 1 to run on past the time when it ought to have stopped. One method of avoiding such a happening is to start the counter 3 with the received signal and stop it with a pulse corresponding to maximum range derived from the ranging oscillator by the transmitted radar pulse. The counter 3 is reset to $m$ times maximum range at the end of every batch of $m$ range samples, and the oscillator 1 is used to subtract ONE from the accumulated total for every $\Delta R$ period.

What we claim is:

1. A pulse radar ranging system including means for generating a sequence of pulses regular in time, means for generating a set of first pulses each so timed relative to a radar transmitted pulse that either it is contemporaneous with the radar transmitted pulse or separated therefrom by a number of pulses in the sequence of pulses representing the maximum range to be measured and whose timing is random compared with the sequence of pulses, means for generating a set of second pulses each contemporaneous with a radar received pulse, whereby an interpulse period of a first kind is defined as that period which starts with a first pulse contemporaneous with a radar transmitted pulse and ends with the next occurring second pulse and an interpulse period of a second kind is defined as that period which starts with a second pulse and ends with the next occurring first pulse representing maximum range, counting means, means for allowing the sequence of pulses to be applied to the counting means for the duration of a plurality of interpulse periods of the same kind as each other, and means for extracting from the counting means the count registered in the counting means divided by the number of interpulse periods for the duration of which the sequence of pulses was applied to the counting means.

2. A pulse radar ranging system as claimed in claim 1 in which the sequence of pulses is applied to the counting means for a plurality of interpulse periods of the first kind, and means for resetting the counting means to zero at the commencement of the plurality of interpulse periods.

3. A pulse radar ranging system as claimed in claim 1 in which the sequence of pulses is applied to the counting means for a plurality of interpulse periods of the second kind, means for resetting the counting means to its maximum count at the commencement of the plurality of interpulse periods, and means for controlling the counting means in such a way that each pulse applied to it subtracts from the count registered in the counting means.

4. A pulse radar ranging system as claimed in claim 1 and further including data processing means, and means for applying to the data processing means signals representing the count registered in the counting means divided by the number of interpulse periods for the duration of which the sequence of pulses was applied to the counting means.

5. A pulse radar ranging system as claimed in claim 2 and further including data processing means and means for applying to the data processing means signals representing the count registered in the counting means divided by the number of interpulse periods for the duration of which the sequence of pulses was applied to the counting means.

6. A pulse radar ranging system as claimed in claim 3 and further including data processing means and means for applying to the data processing means signals representing the count registered in the counting means divided by the number of interpulse periods for the duration of which the sequence of pulses was applied to the counting means.

* * * * *